May 29, 1956
R. E. WATSON
2,747,599
FLUID PRESSURE REGULATING DEVICE
Filed July 21, 1953
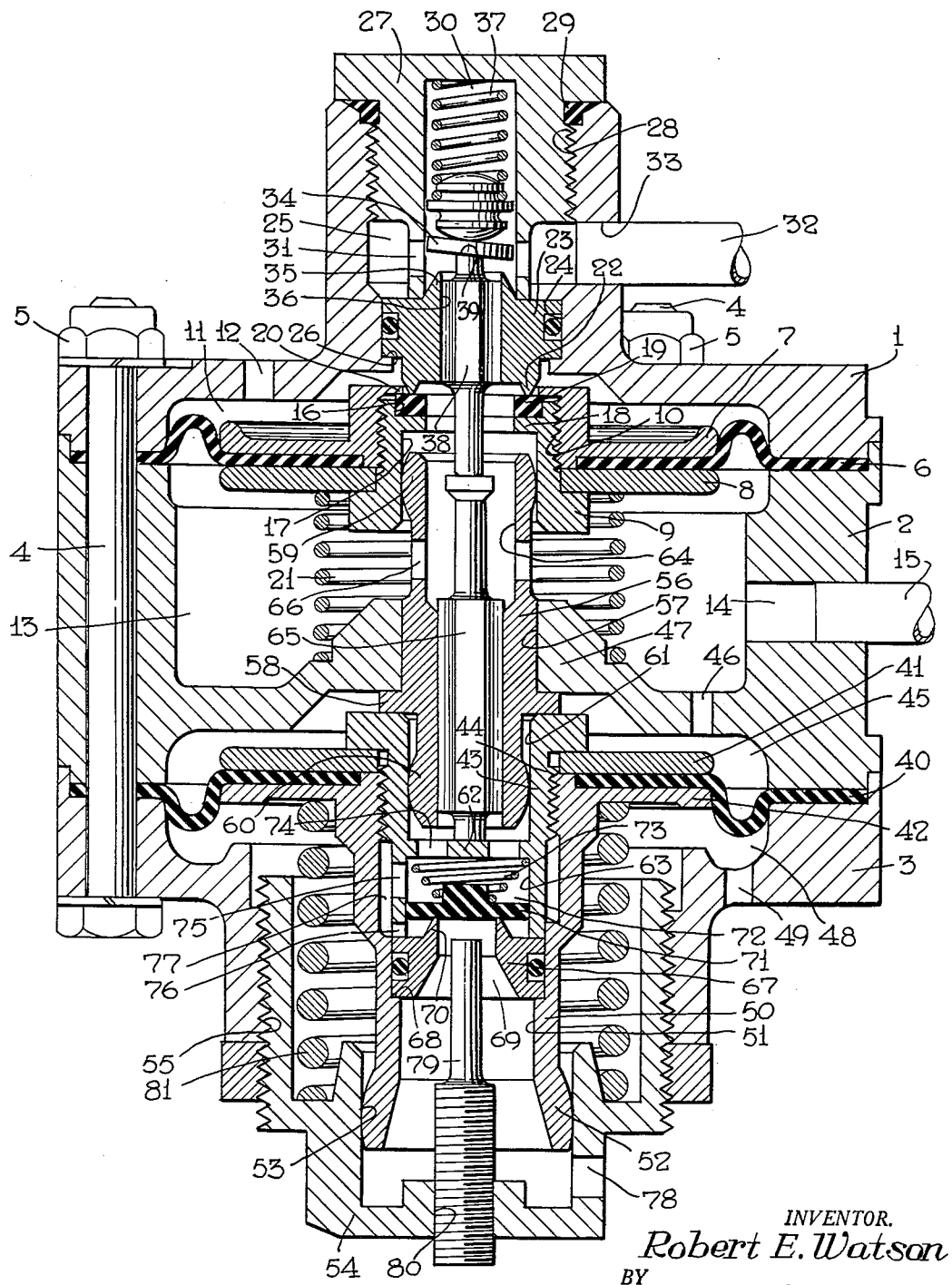
INVENTOR.
Robert E. Watson
BY
Adelbert A. Steinmiller
ATTORNEY

United States Patent Office 2,747,599
Patented May 29, 1956

2,747,599

FLUID PRESSURE REGULATING DEVICE

Robert E. Watson, Edgewood, Pa., assignor to Westinghouse Air Brake Company, Wilmerding, Pa., a corporation of Pennsylvania Application July 21, 1953, Serial No. 369,489

10 Claims. (Cl. 137—116.5)

This invention relates to valve devices and more particularly to valve devices for maintaining pressure of fluid in a chamber or reservoir within desired limits.

In airplanes it is customary to pressurize the oil in the reservoirs of hydraulic systems to a relatively low pressure, generally slightly above atmospheric pressure at sea level, to assure that the oil will remain in a vaporless state for proper operation of said systems. In order to conserve weight, the capacity of such a hydraulic system and the thickness of its oil reservoir are held to a minimum, and it is therefore necessary to prevent a sufficient partial vacuum from being created in the reservoir to prevent collapse of said reservoir, as may occur, for example, if a considerable volume of oil is withdrawn from the reservoir to a hydraulically actuated device or in case of failure of supply of the pressurizing fluid.

One object of the invention is to provide an improved valve device of the above type which is relatively economical in compressed air requirements and is adapted to not only maintain the pressure in the oil reservoir within a selectable range but also to positively prevent a dangerous partial vacuum from being created in said reservoir.

Another object of the invention is to provide an improved valve device of the above type which is adapted to operate over a wide range of supply pressures, such as obtained if bottled compressed air is employed as the source of pressurizing medium.

Other objects and advantages will become apparent from the following more detailed description of the invention.

In the accompanying drawing, the single figure is a side elevational view, partly in section and partly in outline, of a valve device embodying the invention.

Description

Referring to the drawing, the improved valve device may comprise, as viewed in the drawing, an upper casing portion 1, an intermediate casing portion 2 and a lower casing portion 3, said intermediate casing portion at its upper and lower ends being secured by any suitable means, such as a plurality of bolts 4 and nuts 5, to the adjacent ends of said upper and lower casing portions, respectively.

A centrally apertured, resilient diaphragm 6 is clamped at its outer peripheral edge between the adjacent ends of casing portions 1, 2, and is clamped at its inner peripheral edge between upper and lower diaphragm followers 7, 8 by an annular element or nut 9 extending centrally through and engaging the lower end of lower follower 8 and having screw-threaded engagement within an opening 10 in the upper follower 7. At the upper side of diaphragm 6 is a vacuum relief or safety chamber 11 open to atmosphere by way of a port 12 in casing portion 1, while at the lower side of said diaphragm is a fluid pressure delivery chamber 13 adapted for connection with such as an oil reservoir (not shown) by way of a port 14 in casing portion 2 and a delivery pipe 15 for subjecting the oil in said reservoir to pressure of fluid or compressed air in said delivery chamber.

The annular nut 9 has counterbores 16, 17 open to the chambers 11 and 13, respectively, the bases of said counterbores defining opposite sides of an annular flange 18. A resilient, annular vacuum relief or safety valve 19 for controlling fluid pressure communication between chambers 11 and 13 is disposed within the counterbore 16 and clamped by the flange 18 against a partially overlying flange 20 on the upper follower 7. A relatively light spring 21 disposed in the delivery chamber 13 acts on and urges the follower 8 in the direction of chamber 11 for thereby urging the valve 19, carried by said follower, into engagement with a downwardly extending, annular valve seat rib 22 formed integrally with the lower end of a valve seat element 23 and in coaxial relation thereto.

The element 23 is disposed in sealing engagement with the wall of a bore 24 which extends from a fluid pressure supply chamber 25 to an annular, inwardly directed positioning shoulder 26 in casing portion 1. The element 23 is pressed into engagement with shoulder 26 by a nut 27 which engages the upper end of said element. The nut 27 has screw-threaded engagement within an opening 28 extending from the upper end of casing portion 1 to the supply chamber 25 and engages said upper end for compressing a resilient sealing ring 29 between said casing portion and nut to seal the upper end of said casing portion. The nut 27 has a recess 30 which extends upwardly from its lower end in coaxial alignment with the element 23. Radial openings 31 in the nut 27 establish open fluid pressure communication between the recess 30 and the supply chamber 25, which chamber is chargeable with fluid under pressure from a source thereof (not shown) by way of a fluid pressure supply pipe 32 connected to a port 33 in casing portion 1. A disk-shaped supply valve 34 for controlling fluid pressure supply communication between chambers 25 and 13 is disposed in the recess 30 of nut 27 and adapted for seating engagement with an annular, upwardly projecting valve seat rib 35 formed integrally with the valve seat element 23 and encircling a bore 36 extending axially therethrough and connecting said chambers. A spring 37 disposed in the recess 30 urges the valve 34 into engagement with its seat 35. A stem 38 for controlling the valve 34 comprises, intermediate its ends, a concentrically arranged fluted portion slidably guided within the bore 36 and of larger diameter than the remaining portion thereof. The upper transverse end 39 of stem 38 is shaped at an angle to the horizontal so that as it engages the valve 34, it will tilt said valve relative to its seat 35 and thereby facilitate unseating thereof. The lower portion of stem 38 projects centrally with substantial clearance into the counterbore 17 of annular nut 9.

A centrally apertured, resilient diaphragm 40, arranged in coaxial relation to diaphragm 6, is clamped at its outer peripheral edge between the adjacent ends of casing portions 2, 3, and is clamped at its inner peripheral edge between upper and lower diaphragm followers 41, 42 by a nut-like element 43 which extends centrally through and engages the upper end of upper follower 41 and has screw-threaded engagement, intermediate its ends, within the wall of an opening 44 in lower follower 42.

At the upper side of diaphragm 40 is a chamber 45 which is in constant fluid pressure communication with the delivery chamber 13 by way of a restricted opening 46 extending through a partition wall 47 of casing portion 2 for controlling rate of flow of compressed air between said chambers for reasons to be brought out in subsequent description of operation. At the lower side of diaphragm 40 is an exhaust chamber 48 open to atmosphere by way of an exhaust port 49 in casing portion 3.

The lower follower 42, disposed in exhaust chamber 48, has a depending portion 50 which has an opening 51 extending therethrough in coaxial alignment with the threaded opening 44. At its lower end the portion 50 has a ball-like part 52 which is disposed within a coaxially aligned bore 53 in a nut 54 and makes line contact with the wall of said bore to avoid binding between said part and wall during adjustment of said nut and operation of the device; said nut having screw-threaded engagement within an opening 55 through the lower end of casing portion 3.

A sleeve member 56 has press fit engagement with the wall of a bore 57 extending through the partition wall 47 of casing portion 2 in coaxial relation to the diaphragms 6 and 40 and is disposed in a position defined by engagement of an outwardly directed, annular positioning flange 58 with the lower side of wall 47. The member 56 has an upwardly extending portion terminating in a ball-like part 59 disposed within the counterbore 17 in annular nut 9 and making line contact with the wall of said counterbore to avoid binding between said part and wall during movement of the followers 7, 8. The member 56 has a downwardly extending portion terminating in a ball-like part 60 disposed within, and making line contact with the wall of, a coaxially aligned bore 61 in the element 43, which bore is open to chamber 45 and is separated by a partition wall 62 from a coaxially aligned bore 63 extending upwardly from the lower end of said element. The member 56 has a central stepped bore 64 extending therethrough, and within the lower, small diameter portion of said bore is slidably guided the fluted lower part of a cylindrical stem 65.

The upper part of stem 65 projects with substantial clearance into the upper portion of bore 64, which is in constant fluid pressure communication with the delivery chamber 13 by way of radial openings 66 through the wall of sleeve member 56. At its upper end the stem 65 is adapted for operative abutting engagement with the lower end of stem 38 for controlling unseating of the supply valve 34, while at its lower end said stem is supported on the partition wall 62 in element 43.

An exhaust valve seat element 67 is disposed in sealing engagement with the wall of opening 51 in follower portion 50 and is held in engagement at its lower end with a positioning shoulder 68 in the wall of said opening by engagement with its upper end of the lower end of element 43. The seat element 67 has a central vertical opening 69 therethrough, encircling which is an integrally formed, annular exhaust valve seat rib 70 to which projects upwardly into the bore 63 of element 43 and is adapted to accommodate seating engagement of a coaxially aligned exhaust valve 71 slidably guided on the wall of said bore in an exhaust control chamber 72 formed between said seat element and the partition wall 63. A compression spring 73 disposed in chamber 72 acts on and urges movement of valve 71 into engagement with its seat 70. The control chamber 72 is in constant fluid pressure communication with the delivery chamber 13 by way of the opening 66, bore 64, fluted stem 65, and a plurality of vertical openings 74 through the partition wall 62. The wall of element 43 below partition wall 62 is perforated by openings 75 and 76 above and below the valve 71, respectively, which openings are in constant fluid pressure communication with each other by way of an annular space 77 formed in the follower portion 50 in encirclement of element 43; said openings and space being provided to enable compressed air to flow around the valve 71 to opening 69 and thence to atmosphere via opening 51 on the follower portion 50 and a port 78 in nut 54 when said valve is unseated in a manner now to be described.

A rod 79 having adjustable screw-threaded engagement within the wall of a central opening 80 through nut 54 projects centrally upward from said nut through the bore 53 and opening 51 into opening 69 in seat element 67. The upper end of rod 79 is in proximity to the exhaust valve 71 so that upon downward movement of the followers 41, 42 said valve will be unseated through abutting engagement with the upper end of said rod, as will become apparent from subsequent description.

A compression spring 81 disposed in the exhaust chamber 48 is arranged between and engages the lower follower 42 and nut 54 for urging the followers 41, 42 upwardly toward a position in which the upper end of element 43 abuts the flange 58, and in which position the supply valve 34 is unseated through the medium of the partition wall 62 acting on the stems 65 and 38. The degree of compression of the spring 81 may be regulated by adjustment of the position of nut 54 within the opening 55 for controlling the pressure of fluid required in chamber 45 to effect downward movement of followers 41, 42 and consequently controlling the pressure of fluid required to unseat the exhaust valve 71.

*Operation*

In operation, assume initially that the nut 54 has been adjusted to cause spring 81 to exert on the lower follower 42 a force corresponding to the pressure of fluid desired to be obtained in the delivery chamber 13; that the rod 79 has been adjusted to a position corresponding to some pressure of fluid slightly in excess of that desired in said delivery chamber and at which it is desired to cause venting of said delivery chamber; and that the supply chamber 25 and delivery chamber 13 are filled with air at atmospheric pressure. As a consequence of these assumed conditions, the aforementioned reservoir will be at atmospheric pressure by way of the pipe 15 and chamber 13.

As shown in the drawing, the chamber 45, being in communication with the delivery chamber 13 by way of the restricted opening 46, likewise contains air at atmospheric pressure and consequently the diaphragm followers 41, 42, by virtue of the action of spring 81, are in an uppermost position, in which the element 43 abuts the flange 58 of sleeve member 56. In such position of the followers 41, 42, the seat element 67 carried therewith is in such position that the rod 79 is out of engagement with the exhaust valve 71, and said valve, by virtue of the action of spring 73 thereon, is consequently in engagement with its seat 70; and the partition wall 62 acting through the stems 65 and 38 maintains the supply valve 34 unseated from its seat 35. The diaphragm followers 7, 8 are also in an uppermost position in which the safety valve 19 is in seating engagement with its seat 22, by virtue of the action of spring 21 on said followers, since the chambers 11 and 13 at opposite sides of diaphragm 6 are filled with air at atmospheric pressure.

Assume now that the supply chamber 25 is charged with compressed air from the aforementioned source by way of the supply pipe 32. Such air will flow from the supply chamber 25 to the delivery chamber 13 by way of the unseated supply valve 34, fluted stem 38, counterbores 16 and 17 in the annular nut 9, bore 64 and openings 66; and from said delivery chamber compressed air will flow to the aforementioned reservoir by way of pipe 15, as well as to the chamber 45 at a controlled, dampening rate, by way of the restricted opening 46. When the pressure of air thus obtained in chamber 45 increases sufficiently to overcome the pre-loaded compressive force exerted by spring 81 on follower 42, the followers 41 and 42 will be carried downward by deflection of the diaphragm 40 against resistance of said spring. During this downward movement, the stem 65 at its lower end will be maintained in abutting engagement with partition wall 62 by action of spring 37 on the supply valve 34 and stem 38, until said supply valve engages its seat 35 and thereby terminates the supply of compressed air to the delivery chamber 13 and hence to chamber 45, at a chosen pressure therein corresponding to the preadjusted pressure of spring 81 on lower follower 42. As long as the pressure of air in the chambers 13 and 45 and in the reservoir remains at the chosen value just mentioned, the diaphragm 40 will be held in equilibrium by the substantially balanced opposing effects thereon of the pressure of air in chamber 45 and the action of spring 81, and as a consequence the supply valve 34 will remain seated.

Assume now that oil is displaced back to the reservoir, such as upon release of such oil from a hydraulically actuated device. Such displacement will effect an increase in the pressure of the air above the oil in the reservoir and consequently in the chambers 13 and 45. In response to this increased pressure of air in chamber 45, the diaphragm 40 will be deflected downward, thereby carrying the seat element 67 associated therewith and likewise carrying the exhaust valve 71, which is held seated by action of spring 73 and pressure of fluid in chambers 13 and 72. If the pressure of air in chamber 45 is thus increased to a degree which exceeds the value at which the rod 79 has been adjusted to effect venting of the delivery chamber 13, the diaphragm 40 will continue to deflect downward in the manner just described and carry the exhaust valve 71 into abutting engagement with the upper end of rod 79, whereupon said rod will hold said valve stationary during continued downward deflection of said diaphragm and thereby disengage said valve against resistance of spring 73. With the exhaust valve 71 thus unseated, an exhaust communication is established from the delivery chamber 13 to atmosphere by way of openings 66, the fluted stem 65, openings 74 in partition wall 62, control chamber 72, opening 75, space 77, opening 76, the unseated valve 71, and the exposed contiguous portions of openings 69, 51 and bore 53, and the port 78; and since the air chamber in the reservoir and chamber 45 are in constant fluid pressure communication with said delivery chamber, compressed air in these chambers will likewise be vented to atmosphere by way of said exhaust communication.

Compressed air will continue to escape from chamber 13 to atmosphere as just described until the effect of spring 81 on diaphragm 40 predominates sufficiently over the opposing effect thereon of the reducing pressure of air in chamber 45 to cause followers 41 and 42 to move upward to a position where the exhaust valve 71 is carried out of engagement with rod 79 and is seated under action of spring 73; whereupon a new equilibrium position is attained and upward movement of said followers ceases, and pressure of air in chambers 13 and 45 and in the reservoir will then once again be bottled up at the selected degree, as will be understood from preceding description.

Assuming now that the pressure of air in the reservoir and hence in chambers 13 and 45 is decreased, such as by virtue of withdrawal of oil from the reservoir to a hydraulically actuated device, the effect of spring 81 will predominate over the reduced pressure of fluid in chamber 45 and consequently cause the diaphragm 40 to deflect upward, carrying with it the stem 65 which, in turn, will advance the stem 38 through abutting engagement therewith, causing the uppermost part of the inclined end 39 of stem 38 to contact and then tiltingly unseat the supply valve 34 against resistance of spring 37, thereby permitting compressed air from the aforementioned source to boost the pressure of air in chambers 13 and 45 and in the reservoir, until the increasing pressure of air in chamber 45 causes the diaphragm 40 to deflect downward and effect reseating of said supply valve, as will be understood from preceding description.

If the supply of fluid under pressure to supply chamber 25 should become substantially depleted, or fail for any reason, or if the spring 81 should fail or the supply valve 34 stick to its seat and thereby prevent obtainment of desired pressurization of chamber 13 and the reservoir, the valve device is operative, in the manner now to be explained, to prevent creation in the reservoir (due to withdrawal of oil therefrom) of a partial vacuum sufficient to cause undesired emulsification and/or vaporization of oil therein and/or collapse of the reservoir.

Assume that, as a result of a failure or depletion of supply of compressed air to chamber 25, the pressure of air in the reservoir and hence in the chambers 13 and 45 becomes reduced below the delivery pressure for which spring 81 is adjusted. The followers 41 and 42 will consequently move into such position as to effect unseating of the supply valve 34 but without consequence in that, as assumed, no compressed air is being supplied to chamber 25. Under these conditions, if the pressure of air in the delivery chamber 13 reduces further and slightly below the atmospheric pressure in safety chamber 11, the diaphragm 6 will be deflected downward by the latter pressure against the relatively light resistance of spring 21 and cause downward movement of the followers 7 and 8, thereby carrying the valve 19 away from its seat 22, whereupon air from the atmosphere will flow from chamber 11 by way of the unseated valve 19 to the bore 64 and thence by way of the previously described communication to the delivery chamber 13 and reservoirs. When the pressure of air in chamber 13 and the reservoir has thus increased to within the value of spring 21 less than atmospheric pressure, the diaphragm 6 will deflect upward under action of spring 21 and cause the valve 19 to reseat against its seat 22. In this manner, the degree of vacuum which may occur in the reservoir, in case of failure of compressed air supply, is so limited as to positively preclude possibility of collapse of the reservoir.

Any desired delivery pressure in chamber 13, limited only by source pressure, may be readily obtained by adjustment of the position of nut 54 within the opening 55 to effect a degree of pre-loading of spring 81 to correspond to the delivery pressure desired. The rod 79 is adjustable within the opening 80 such that the more it is elevated, the less the increase in pressure in chamber 45 (as governed by spring 81) at which the exhaust valve 71 will be unseated, and vice versa; hence the adjustment of said rod provides for obtaining any selected range of pressure variation in chamber 13 between seating of the supply valve 34 and unseating of the exhaust valve 71.

*Summary*

It will now be seen that the improved valve device will automatically limit pressure of fluid in a reservoir or the like to not only a desired selected maximum value but also to a desired selected minimum value, both of which values are adjustable to provide for any selected range of air pressure variation, wherever such is desired. Moreover, in case of failure of the air supply for pressurizing the reservoir, the valve device is automatically operative to limit to a predetermined value the degree of vacuum which may be obtained in the reservoir incident to withdrawal of hydraulic fluid therefrom, for thereby preventing collapse of said reservoir.

Having now described my invention, what I claim as new and desire to secure by Letters Patent, is:

1. In a control valve device, the combination of a casing having a delivery chamber communicable with an apparatus, supply valve means, normally seated, for controlling supply of fluid under pressure to said delivery chamber, actuating means operative in response to reduction in pressure of fluid in said delivery chamber to unseat said supply valve means, movable abutment means subject on one side to air at atmospheric pressure and subject on the opposite side to pressure of fluid in said delivery chamber, an annular seat element mounted in said casing and having one end for accommodating seating engagement of said supply valve means, an annular vacuum relief valve carried by and operable by said movable abutment means for controlling admission of air from atmosphere to said delivery chamber, and a spring acting on said movable abutment means for normally maintaining same in a position in which said relief valve is seated in coaxial relation with and against the opposite end of said annular seat element but of such effect as to be compressed by atmospheric pressure acting on said movable abutment means when the pressure of fluid in said delivery chamber drops below atmospheric pressure for thereby enabling unseating of said relief valve.

2. In a control valve device, the combination of a casing having a delivery chamber communicable with an apparatus and also having an exhaust communication open to atmosphere, supply valve means, normally seated, for controlling supply of fluid under pressure to said delivery chamber, actuating means operative in response to reduction in pressure of fluid in said delivery chamber to unseat said supply valve means, exhaust valve means, normally seated, operably carried by said actuating means for controlling fluid pressure connection between said delivery chamber and said exhaust communication and operative upon the attainment of a predetermined pressure in said delivery chamber to unseat said exhaust valve means, and means including relief valve means operative independently of said actuating means to admit air from atmosphere to said delivery chamber in response to reduction in pressure of fluid in said delivery chamber below atmospheric pressure.

3. A valve device for controlling pressurization of fluid in an apparatus, comprising in combination, a casing having a supply chamber chargeable with fluid under pressure from a source thereof, a delivery chamber communicable with said apparatus, and an exhaust communication connecting said delivery chamber to atmosphere, a supply valve, normally seated, for controlling admittance of fluid under pressure to said delivery chamber, movable stem means operatively connected at one end to said supply valve, a first follower adapted for operative abutting engagement with an opposite end of said stem means, a first spring operative to actuate said first follower to unseat said supply valve, a first flexible diaphragm secured to said follower and casing and subject on one side to pressure of fluid in said delivery chamber and on the opposite side to atmospheric pressure and to action of said first spring, an exhaust valve, normally seated, carried by said first follower for controlling fluid pressure connection between said delivery chamber and said exhaust communication, rod means disposed within said exhaust communication and adapted to accommodate operative abutting engagement of said exhaust valve upon attainment of a predetermined pressure of fluid in said delivery chamber and operative to unseat said exhaust valve upon any increase above such predetermined pressure, a second follower, a vacuum relief valve carried by said second follower, a second spring arranged in said delivery chamber for normally maintaining said relief valve seated, and a second flexible diaphragm secured to said casing and second follower subject at one side to atmospheric pressure and at the opposite side to pressure of fluid in said delivery chamber and to action of said second spring and operative upon a reduction in pressure of fluid in said delivery chamber to a value fractionally below atmospheric to cause movement of said second follower for unseating said relief valve to effect admittance of air from atmosphere to said delivery chamber.

4. A fluid pressure control valve device comprising a casing, two spaced apart, coaxially aligned, movable abutment means in said casing subject on their adjacent faces to pressure of fluid in a delivery chamber and on their opposite faces to atmospheric pressure, a pressure regulating spring acting on one of said abutment means in opposition to pressure of fluid in said delivery chamber, a fluid pressure supply valve disposed in a supply chamber in said casing controlling communication between said supply and delivery chambers, a fluid pressure release valve carried by said one of said abutment means controlling a fluid pressure release communication from said delivery chamber, stem means carried by said one abutment means operative upon movement thereof from a neutral position in the direction of said delivery chamber to open said supply valve, rod means carried by said casing operative upon movement of said one abutment from said neutral position in the opposite direction to engage and open said release valve, the other of said two abutment means controlling communication between said delivery chamber and atmosphere, and spring means acting on said other abutment means opposing atmospheric pressure thereon.

5. In a control valve device, the combination of a casing, a seat element carried by said casing having a through opening for connecting a supply chamber to a delivery chamber in said casing and also having an annular seat rib encircling one end of said opening for separating said delivery chamber from a relief chamber in said casing surrounding said seat rib, a fluid pressure supply valve in said supply chamber normally seated against said seat element in encirclement of the opposite end of said opening and controlling fluid pressure communication through said opening, pressure regulating means, first movable abutment means subject opposingly to fluid pressure in said delivery chamber and action of said regulating means and operative in response to movement of said first movable abutment means toward said delivery chamber to unseat said supply valve, an annular fluid pressure relief valve normally seated against said seat rib and controlling fluid pressure communication between said relief chamber and delivery chamber, a regulating spring, second movable abutment means carrying said relief valve and normally in one position for seating said relief valve and movable to another position for unseating said relief valve only when the effect of fluid pressure in said relief chamber overcomes the opposing effect thereon of fluid pressure in said delivery chamber and action of said spring.

6. In a fluid pressure control valve device, the combination of a casing having a delivery chamber for connection with an apparatus in which fluid pressure is to be controlled, movable abutment means subject at one side to fluid pressure in said delivery chamber, regulating means acting on said movable abutment means in opposition to fluid pressure in said delivery chamber for exerting a preload thereon corresponding to a chosen value of pressure in said delivery chamber, a fluid pressure supply valve, normally seated, for controlling supply of fluid under pressure to said delivery chamber, a fluid pressure release valve, normally seated, carried by said movable abutment means for controlling release of fluid under pressure from said delivery chamber to an exhaust communication, stem means operative upon movement of said movable abutment means in response to a reduction in pressure in said delivery chamber below said chosen value to unseat said supply valve, means carried by said casing adapted to directly engage and unseat said release valve in response to an increase in pressure in said delivery chamber above a chosen higher value, the last named means being adjustable for varying the distance between such means and said release valve for thereby permitting preselection of said chosen higher value of pressure by regulating the degree of movement of said movable abutment means required against increasing resistance of said regulating means to cause unseating of said release valve.

7. A fluid pressure control valve device comprising a casing, a seat element carried by said casing and having a through opening connecting a supply chamber and a delivery chamber in said casing, a fluid pressure supply valve disposed in said supply chamber controlling communication through said opening and normally seated against said seat element adjacent one end of said opening, two spaced apart, coaxially aligned movable abutment means subject on their adjacent faces to pressure of fluid in said delivery chamber, a first pressure regulating spring acting on one of said movable abutment means in opposition to fluid pressure in said delivery chamber, a fluid pressure release valve carried by said one of said movable abutment means for controlling a fluid pressure release communication from said delivery chamber, actuating means operative in response to movement of said one movable abutment means in a direction toward said delivery chamber to unseat said supply valve, other means carried by said casing and operative upon movement of said one movable abutment means in the opposite direction to successively engage and then unseat said release valve, an annular, fluid pressure relief valve for controlling communication between said delivery chamber and a relief chamber in said casing, and a second regulating spring acting on the other of said movable abutment means in opposition to fluid pressure in said delivery chamber, said other movable abutment means carrying said relief valve and normally assuming one position for seating said relief valve in encirclement of the opposite end of said opening and movable to another position for unseating said relief valve only when fluid pressure in said relief chamber overcomes the opposing effect of fluid pressure in said delivery chamber and action of said second spring.

8. The combination according to claim 7, wherein said other means is adjustable relative to said casing for regulating the extent of movement required of said one movable abutment means against resistance of said first spring to cause unseating of said release valve.

9. The combination according to claim 7, wherein said other means is adjustable for varying the distance between said other means and release valve for thereby regulating to a pre-selected value the pressure in said delivery chamber at which said release valve will be unseated by movement of said one movable abutment means against resistance of said first spring.

10. A fluid pressure control valve device for controlling the pressure of fluid in an apparatus, said device comprising a casing, a seat element carried by said casing and having a through opening connecting a supply chamber and a delivery chamber in said casing, a fluid pressure supply valve controlling a supply communication through said opening and normally seated against said seat element for closing such communication, two spaced apart movable abutment means subject on their adjacent faces to pressure of fluid in said delivery chamber, regulating means for exerting a preload on one of said movable abutment means in opposition to pressure of fluid in said delivery chamber according to a chosen value of pressure desired in said delivery chamber, actuating means carried by said one movable abutment means operative in response to a reduction in pressure in said delivery chamber below said chosen value to unseat said supply valve, a fluid pressure release valve, normally seated, carried by said one movable abutment means for controlling a release communication from said delivery chamber, means adjustable relative to said casing for engaging and unseating said release valve upon movement of said one movable abutment means against resistance of said regulating means responsive to attainment of a chosen higher value of pressure in said delivery chamber, a fluid pressure relief valve normally seated against said seat element controlling communication between said delivery chamber and a relief chamber in said casing surrounding said opening, the other of said two movable abutment means controlling operation of said relief valve, and spring means acting on said other movable abutment means opposing pressure of fluid in said relief chamber such that said relief valve will be unseated only if pressure in said delivery chamber is reduced a corresponding degree below that in said relief chamber.

References Cited in the file of this patent

UNITED STATES PATENTS

| | | |
|---|---|---|
| 2,089,144 | Work | Aug. 3, 1936 |
| 2,156,823 | Stettner | May 2, 1939 |
| 2,184,773 | Browning | Dec. 26, 1939 |
| 2,259,809 | Freeman | Oct. 21, 1941 |